United States Patent [19]
Mason

[11] Patent Number: 5,661,921
[45] Date of Patent: Sep. 2, 1997

[54] ARTIFICIAL FISHING LURE WITH FINS

[76] Inventor: Marvin Howard Mason, 545 Harrisburg Rd., Alexandria, Ky. 41001

[21] Appl. No.: 645,159

[22] Filed: May 13, 1996

[51] Int. Cl.⁶ .................................................. A01K 85/00
[52] U.S. Cl. ....................... 43/42.09; 43/42.06; 43/42.47; D22/128
[58] Field of Search ........................ 43/42.09, 42.47, 43/42.06, 42.24, 42.26, 42.27; D22/128, 132

[56] References Cited

U.S. PATENT DOCUMENTS

| | | | |
|---|---|---|---|
| 1,976,695 | 10/1934 | Boehm | 43/42.26 |
| 1,993,990 | 3/1935 | Catarau | 43/42.06 |
| 2,038,829 | 4/1936 | Cronin | 43/42.47 |
| 2,696,693 | 12/1954 | Markquart | 43/42.37 |
| 2,736,981 | 3/1956 | Bonanno | 43/42.39 |
| 2,979,850 | 4/1961 | Lund | 43/42.24 |
| 3,082,562 | 3/1963 | Duncan | 43/42.26 |
| 3,344,549 | 10/1967 | Peters et al. | 43/42.24 |
| 4,337,591 | 7/1982 | Gell et al. | 43/42.39 X |
| 5,517,782 | 5/1996 | Link et al. | 43/42.06 X |

FOREIGN PATENT DOCUMENTS 757492  9/1956  United Kingdom .................. 43/42.09

*Primary Examiner*—Jeanne Elpel

[57] ABSTRACT

An artificial fishing lure, composed of a plastic injection molded body, having hangers for hooks, a bill or lip, a cylindrical body, including a groove encompassing the body just aft of the head, a channel molded into each side beginning on the bill or lip continuing through and to a point aft of the groove, wherein a molded plastic ring and fin assembly are mounted. Water is passed along the channels at each side of the body when the lure is moved, causing an increase in pressure on the underside of the fin assembly, resulting in a lifelike motion of the fin.

8 Claims, 1 Drawing Sheet

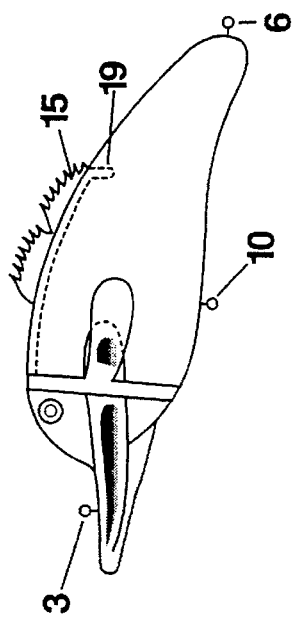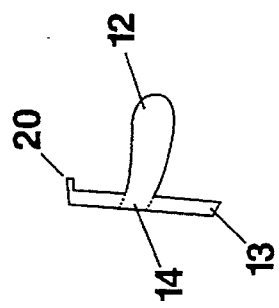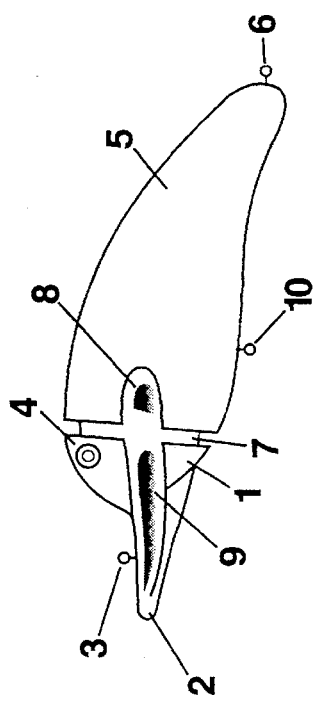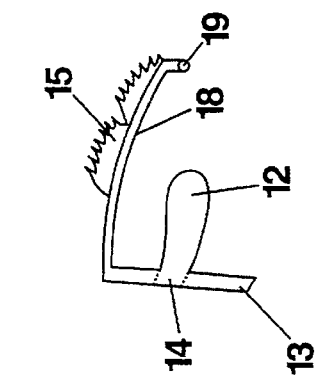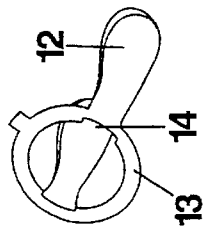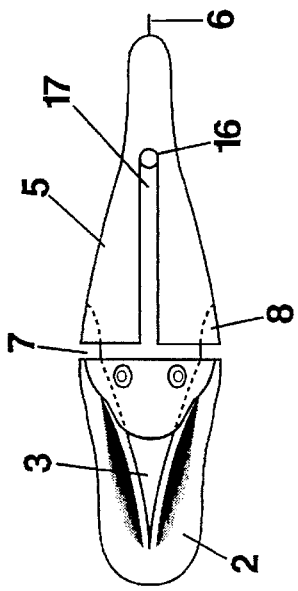

ARTIFICIAL FISHING LURE WITH FINS

CROSS-REFERENCES TO RELATED APPLICATIONS

None

BACKGROUND OF THE INVENTION

1.) Field of the Invention

This invention relates to fishing lures and the application of various apparatus for the purpose of adding attraction to the lure.

2.) Background Art

Many varieties of artificial fishing lures are used by anglers in pursuit of game fishes. Each lure has in common some method for adding attraction to the lure for the purpose of enticement of the preferred species. These methods include rattles, colors, appendages and others.

This invention seeks to provide a new method for adding attraction to a lure, by means of making the lure appear more lifelike to the gamefish being sought by the angler. The addition of removable, and therefore interchangeable flexible fins will provide the angler with the means to adapt a style of lure of known effectiveness, to meet the requirements of the fish he is seeking immediately.

SUMMARY

A plastic molded fishing lure, incorporating the use of a pair of replaceable molded fins or gills, mounted on the head of the lure. The fins and mount being of a design and manufacture to provide gamefish attracting motion when said lure is moved through the water, or when currents flow past the lure causing movement of the fins.

The design of the mount of the fins incorporates a ring that is slipped over the head of the lure into an indentation or groove molded into the head portion of the lure. The stretching action of the installation of the ring over the head of the lure and the indentation in the body of the lure provide a snug, non-slip fit of the two pieces.

Grooves molded into the bill or lip of the lure and into the side portion of the ring provide a path for water flow under each of the fins thus providing motion of the fins with very little motion of the lure body.

An additional style of flexible ring and fin attachment incorporates a groove molded into the top of the lure body and a flexible dorsal fin attached at the top of the ring. The dorsal fin attachment is a part of the ring and fin attachment when this option is selected. The dorsal fin is molded as a part of the ring and fin and connects to the body of the lure through the use of a groove on the top of the lure ending near the tail section at a circular socket. The dorsal fin has molded into it's most rearward end a "ball" of the molded material for the purpose of being inserted into the socket to anchor the fin to the body of the lure.

BRIEF DESCRIPTION OF THE DRAWINGS

FIG. 1 Detailed side view of the molded lure, showing the groove area for the ring mount, lip, and channel.

FIG. 2 Detailed overhead view of the lure showing the ring mount groove, and channels in the lip or bill, and when selected, the groove in the top of the lure for the optional dorsal fin.

FIG. 3 15 degree side view of the ring and fin apparatus showing the mount area of the fin attachment, and channels in the ring.

FIG. 4 Detailed side view of the molded fin and ring.

FIG. 5 Detailed side view of the optional dorsal fin attached to the body of the lure.

FIG. 6 Detailed side view of the ring and fin, and the optional dorsal fin.

SPECIFICATION

Detailed description

The invention consists of an artificial fishing lure body (5) and attachment, imitating fins or gills on a baitfish. The design of the lure incorporates a molded indentation or groove (7), completely encircling the body just behind the head (1) portion. The purpose of the groove (7) is to provide an area to fit the accompanying ring and fins (13,12). The groove (7) is of a depth and width, sized to fit the ring and fin tightly to the lure body (5), being located approximately at the rear portion of the head (1) area of the lure.

Molded into the lip (2) of the lure are two rounded channels (9), beginning one third the distance from the tip of the lip (2) and continuing on toward and into the head section (1) of the lure. Channels (8) in the head area (1) intersect with the groove (7) and work in conjunction with corresponding channels (14) molded into the ring (13) to pass water under the ring (13), for the purpose of providing water pressure under the fin (12), to cause said fin to move with the changing pressure.

The lure includes two eyes (4), one on each side of the head (1), an elongated body (5), mounting rings (6,10) for hooks, a lip or bill (2), a line attachment ring (3), and ring and fin attachment (13,12). The design of the lure body (5), ring and fin attachment (13,12) remains constant, though of various sizes. The dug and fins (13,12) are sized according to the size of the body (5) of the lure to provide for a snug non-slip fit of the ring and fins to the body (5).

The design of the ring and fin (13,12) incorporates the fin (12), ring (13) and a channel (14) at the inner edge of the ring circle. The ring (13) is sized to be stretched as it is passed over the bill or lip (2) and head (1) of the lure (5). The ring (13) has a tab (20) located at the top that fits into a notch in the top of the ring groove (7), to aid in locating the ring (13) in relation to the body (5). The ring has two indentations (14) molded into the inner surface at 90 and 270 degrees as measured from the top. These indentations in the ring (14), in conjunction with channels (8) molded into the lure body (5) provide channels (8) for water flow under the ring past the body of the lure, causing motion to the attached fins. This action of the fins emulates the motion of the gills, and or pectoral fins of a baitfish.

The fin (12) is a tapered flexible plastic/rubberized material to provide movement when water passes under the ring (13) and out through the channels (8) in the ring groove (7). The changing water pressure created by the passage of the water under the ring (13) forces the fin (12) outward, away from the body (5). The fins (12) and ring (13) are molded as one piece, with the fins (12) at an approximate 15 degree angle to the body (5) of the lure when correctly installed.

The flexible nature of the fin (12) allows the fin to fold flat against the side of the body (5) when the lure is pulled quickly through the water, preventing the fin (12) from interfering with the normal action of the lure. When forward motion is slowed, the pressure under the fin (12) increases to a point greater than that on the outside surface of the fin (12), resulting in an outward motion of the fin (12), much like that of a baitfish. Further motion of the lure (5) results in a continuing change of the pressure under the fin (12) resulting in a flapping motion of the fin (12).

When the optional dorsal fin attachment (15) is selected, a groove (17) is molded into the top of the body (5) of the lure. The groove (17) extends from the ring groove (7) along the top of the body (5) and ends near the tail of the lure body (5) at a circular socket (16), or round hole molded into the body (5). The ball (19) is the means for attaching the end of the dorsal fin (15) to the body (5).

When the optional dorsal fin (15) is selected, the ring (13) has at it's top an extension (18) incorporating a section of flexible material simulating the dorsal fin of a baitfish. The extension (18) and fin (15) fit into a groove (17) in the top of the body (5) of the lure and extends toward the tail to a point approximately two-thirds the distance from the head (1), at which point a socket or hole (16) is located in the body (5) of the lure. A ball of material (19) is molded at the end of the extension (18) for the purpose of mating with the corresponding socket (16) in the body (5). The length of the extension fin (15) is slightly less than the length of the corresponding groove (17) in the lure body (5), resulting in a stretching action when the ball (19) is inserted into the socket (16), thereby imparting a snug fit of the extension fin (15) to the body (5) of the lure.

The groove (17) in the top of the lure is straight edged at each side providing a slot for holding the extension (18) and fin (15) in place along the back of the lure body (5).

I claim:

1. An artificial fishing lure, comprising:

a) a lure body having a head portion and a body portion, a bill extending forward of the head portion, and a circumferential groove between the head portion and the body portion;

b) a line attachment means on the lure body, c) hook attachment means on the lure body;

d) a ring fin device including a ring for releasably mating with the circumferential groove, a flexible fin depending from the ring and, whereby a water passageway is formed between the ring and the circumferential groove providing water pressure to cause movement of the flexible fin.

2. The artificial fishing lure of claim 1, wherein the flexible fin comprises a pair of opposing rearwardly extending fins.

3. The artificial fishing lure of claim 2, wherein the ring fin device comprises a plurality of interchangeable ring fin devices, the devices being resilient for stretching over the head portion to removeably and interchangeably mate with the circumferential groove.

4. The artificial fishing lure of claim 2 wherein the ring fin device further includes a locator tab depending from the ring for locating the ring fin device in relation to the lure body.

5. The artificial fishing lure of claim 1, wherein the water passageway is defined by a channel on an inner surface of the ring.

6. The artificial fishing lure of claim 5, wherein the water passageway is further defined by a longitudinally extending channel on the bill intersecting the circumferential groove at the channel on the inner surface of the ring, and further extending to the body portion and terminating in a concave end which directs water out of the water passageway to impinge on the flexible fin.

7. The artificial fishing lure of claim 1 wherein the water passageway comprises two diverging water passageways, each water passageway defined by a channel on an inner surface of the ring, and further defined by a longitudinally extending channel on the bill intersecting the circumferential groove at the channel on the inner surface of the ring, and further extending to the body portion and terminating in a concave end which directs water out of the passageway to impinge on the flexible fin.

8. The artificial fishing lure of claim 1, wherein the ring fin device further includes a depending, longitudinally extending dorsal fin.

* * * * *